United States Patent [19]

Murray

[11] 4,210,566

[45] Jul. 1, 1980

[54] JET INK COMPOSITIONS

[75] Inventor: Lee J. Murray, Appleton, Wis.

[73] Assignee: American Can Company, Greenwich, Conn.

[21] Appl. No.: 972,998

[22] Filed: Dec. 26, 1978

[51] Int. Cl.$^2$ .............................................. C09D 11/02
[52] U.S. Cl. .................................. 260/31.8 T; 106/22; 260/31.8 E
[58] Field of Search ............... 106/22, 30; 260/31.8 E, 260/31.8 T

[56] References Cited

U.S. PATENT DOCUMENTS

| | | | |
|---|---|---|---|
| 2,356,065 | 8/1944 | Keating | 106/22 |
| 3,687,887 | 8/1972 | Zabiak | 260/29.6 WB |
| 3,846,141 | 11/1974 | Ostergren et al. | 106/22 |
| 3,912,520 | 10/1975 | Miyajima et al. | 106/22 |
| 3,994,736 | 11/1976 | Hertz et al. | 106/22 |
| 4,021,252 | 5/1977 | Banczak et al. | 106/30 |
| 4,024,096 | 5/1977 | Wachtel | 260/29.3 |
| 4,026,713 | 5/1977 | Sambucetti et al. | 106/19 |
| 4,045,397 | 8/1977 | Parkinson | 260/29.3 |
| 4,070,322 | 1/1978 | Hwang et al. | 260/29.6 R |
| 4,153,467 | 5/1979 | Yano et al. | 106/20 |
| 4,155,767 | 1/1979 | Specht et al. | 106/22 |
| 4,155,895 | 5/1979 | Rohowetz et al. | 260/33.4 R |

OTHER PUBLICATIONS

International Business Machines, Tech. Disclosure Bulletin, vol. 16, No. 6, Nov. 1973, "Smear Resistance Jet Ink", IBM Corp., Armonk, N.Y.

Primary Examiner—Earl A. Nielsen
Attorney, Agent, or Firm—Robert P. Auber; George P. Ziehmer; Paul R. Audet

[57] ABSTRACT

Ink compositions are provided which are suitable for use in ink jet printing on coated or uncoated substrates to form images which are highly resistant to abrasion and highly penetrant by virtue of the penetrating characteristics of a select solvent system. The ink compositions have improved handling safety and performance characteristics, and contain, in a preferred embodiment a penetrating solvent blend comprised of from about 50 to 90% n-propyl acetate as a major solvent, methyl cellosolve as a high boiling secondary solvent, and, as an auxiliary solvent a lower aliphatic alcohol; from about 3 to 25% by weight of a low molecular weight B or C-stage, modified phenol polymers; a colorant; an electrolyte; and optionally, a surfactant.

26 Claims, No Drawings

JET INK COMPOSITIONS

BACKGROUND OF THE INVENTION

1. Prior Art

U.S. Pat. No. Banczak; 4,021,252; May, 1977
U.S. Pat. No. Wachtel; 4,024,096; May, 1977
U.S. Pat. No. Parkinson, 4,045,397; Aug. 1977
U.S. Pat. No. Hwang; 4,070,322; Jan. 1978
U.S. Pat. No. Keating; 2,356,065; Aug. 1944
U.S. Pat. No. Zabiak; 3,687,887; Aug. 1972
U.S. Pat. No. Ostergren; 3,846,141; Nov. 1974
U.S. Pat. No. Miyajima; 3,912,520; Oct. 1975
U.S. Pat. No. Hertz; 3,994,736; Nov. 1976
U.S. Pat. No. Sambucetti; 4,026,713; May, 1977

Edds et al, "Smear Resistant Jet Ink", IBM Technical Disclosure Bulletin, Vol. 61, No. 6, November 1973.

2. Field of Invention

Metal cans constitute a very widely utilized medium for the protective packaging of a great variety of products, many millions of cans being used daily for packaging of foods, beverages and many other materials. For many years, the common metal can was constructed of tinplated steel, and was customarily referred to in the industry as an ETP can, the initials standing for "electro-tin-plated". Containers of this style are referred to by the public at large as "tin cans". In recent years, however, the metal can industry has developed organic polymeric resinous coatings for metal cans which offer substantially the same protection to the steel as the traditional coating of metallic tin. These organic resin based coatings have been applied both as a top coat over the traditional thin tin coating and as the sole protective coating composition applied directly to the steel can body and/or end components to yield both resin coated ETP cans and resin coated untinned steel cans which are now referred to in the industry as "tin-free steel" or TFS cans.

Manufacturing and processing concerns which package various products in metal cans have found it highly desirable to print, at some point on the can surface, a series of coded symbols which carry information of interest primarily to the packager including the particular machine on which the can was packed, the date and time of packing and perhaps even the identity of the machine operator. Such data are useful in case it is necessary to trace any particular can or cans after they have been packed.

Many of the products packaged in metal cans are subjected to conditions of high temperature, for example 250° F., and high moisture during pasteurization or sterilization procedures carried out before or after the can is filled with product and sealed. In order to be commercially satisfactory, the coded indicia printed on the cans must be capable of withstanding these processing condtions as well as being resistant to rubbing abrasion.

This invention is directed primarily to ink compositions suitable for printing identifying indicia on the resin coated surfaces of TFS, ETP and coated aluminum cans and can components as well as such metals free of organic resins by means of ink jet printing techniques. The ink compositions of this invention are also suitable for printing indicia on most cellulosic surfaces and most polymeric surfaces including plastic films, laminates and pouches.

In a printing apparatus operating on the so-called "ink jet printing" principle, in general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to an electronic signal, the amplitude of the charge being dependent on the amplitude of the signal. The droplets then pass through an electrical field of fixed intensity, causing a varied deflection of the individual droplets dependent on the intensity of the charge associated therewith, after which the deflected drops are allowed to impinge on the base medium which is to receive the decorative or informative printed indicia. Apparatus suitable for carrying out the ink jet printing process is described in detail in U.S. Pat. Nos. 3,465,350 and 3,465,351, issued Sept. 2, 1969. Several components and devices of such apparatus which come into contact with jet ink compositions are often made of polymeric materials. It is in connection wth an apparatus and process as described in the aforementioned patents that the ink of the present invention is designed to function.

In order to operate satisfactorily in an ink jet printing system, an ink must display a consistent breakup length, drop velocity and drop charge under set machine operating conditions. To achieve these ends, the ink must meet strict requirements with regard to viscosity and resistivity, solubility and compatibility of components, stability and anti-skinning properties and must readily redissolve in a suitable solvent for rapid cleanup of the machine components with a minium of effort. The ink must also be stable, that is tolerant to ambient changes especially in temperature and humidity as for example commonly occur during printing in can processing and filling plants. A lack of such stability or tolerance would require frequent readjustment of printer settings to maintain legible indicia. In order to facilitate cleanup of the apparatus after use, the ink components should be readily soluble in a common solvent medium. This will prevent any gradual buildup of ink residues in the system which could result in malfunction. To prevent excessive swelling failures of plastic jet printer parts, solvents used in the ink must also meet solubility and compatibility requirements since the solvents must not excessively solvate the polymers of which the plastic parts are made.

The ink properties set forth above are primarily established by the requirements of the jet printing apparatus. In addition to these requirements, the ink must possess certain other properties which are specifically related to its intended use in the printing of metal cans and, in particular, can bodies intended for the packaging of foodstuffs and beverages.

For example, the ink must properly wet the can surface, whether coated or uncoated, on which the printed indicia are to appear. If the ink is of such compostion that it fails to readily wet the coated metal surface, the ink will bead up on the surface and fail to adhere properly to it. The problem is particularly accentuated by oily or greasy residues left on the can surface from earlier stages of fabrication of the container. On the other hand, if the ink is of such composition as to wet the coated metal surface too readily, the ink drops will flatten out and spread excessively on the surface, diluting the color intensity of the ink and overlapping the image of adjacent dots making the printed image fuzzy and the characters unintelligible. In addition to the requirements of proper wetting of the surface to be printed, the droplets of ink must adhere strongly to the surface after application and drying so that the printed matter is resistant to both physical rubbing or abrasive action and also is resistant to moisture. The ability of the ink to form and retain a desired image on a TFS or coated ETP or aluminum can surface in the presence of moisture and the ability to resist removal by moisture is of great importance in this application because the metal can surfaces are generally damp before, during and after the printing operation. It is particularly difficult to maintain satisfactory adhesion of the ink to metal cans which are subjected to pasteurization, the combination of moisture and high temperature utilized in this process tending to cause the coloring matter to bleed, and to severly reduce the adhesion of the ink to the can body so that it is readily removed by subsequent rubbing or abrasion.

Several attempts have heretofore been made to provide jet ink compositions meeting all of the above requirements and overcoming the difficulties enumerated. An example of such an ink which is utilizable on coated and uncoated substrates, particularly metal cans and can ends, is disclosed and claimed in U.S. application Ser. No. 910,902, filed on May 30, 1978. Another example is U.S. Pat. No. 4,021,252 issued May 3, 1977 to Daniel Philip Banczak and William Eric Tan and commonly assigned herewith, said patent providing excellent inks of the binder type exhibiting the above discussed properties and which are particularly suitable for use on coated and uncoated aluminum cans. Representative inks therein comprise a colorant, a shellac binder, a glycol solvent binder and a water alcohol blend.

Other examples are inks described and claimed in application Ser. No. 634,507 filed Nov. 24, 1975 of R. L. Germonprez, also commonly assigned herewith. The inks of said application are of the binderless type comprising a colorant and a homogeneous blend of water, a lower aliphatic alcohol, an oxygenated aliphatic or cyclic ketone, a surfactant and an aliphatic hydrocarbon. The ink compositions are designed primarily for use on coated TFS or ETP metal cans and comprise a solvent system so selected as to soften and swell the organic polymer substrate sufficiently to allow penetration of the subsurfaces thereof whereby the indicia printed on the substrate become highly resistant to the abrasion and sterilization process. In said compositions, the function of the aliphatic hydrocarbon is to penetrate the thin layer of oily material which serves as a lubricant on the resin coated metal surfaces of can components in the can forming operations.

The present invention represents an improvement over the above and other conventional inks. It has been found that primarily the presence of n-propyl acetate (hereinafter referred to as NPA) as the major solvent, and, secondarily the use of certain resins therewith in jet ink compositions, not only unexpectly provides binder type ink compositions capable of penetrating varied types of organic coatings and lubricants and properly wetting a large number of substrates including coated and uncoated aluminum or steel, but also overcomes other major shortcomings of current jet ink compositions by providing certain commercially required handling, safety, performance and use characteristics.

Certain conventional binderless and binder-type ink compositions capable of printing on both coated and uncoated metal substrates have been found impractical to conventionally manufacture, store, handle and use, due primarily to the characteristics and the amount of the active solvent employed. In contrast with such inks, the ink compositions of this invention are improvements because they employ NPA as the major, active solvent. In addition to being unexpectedly penetrative, composition component-compatable and operative in the required and desired manners heretofore discussed, NPA renders the ink compositions of this invention commercially usable because it does not form explosive peroxides upon exposure to air or oxygen, and has a flash point (60° F., closed cup) which is high enough to allow ink composition manufacture, storage, handling and use at usual ambient temperatures without need of special explosion preventative equipment and measures. Further, NPA is safer to use than such ink compositions since with respect to hazards to workers such as ingestion and inhalation, it is rated in active-systemic Sax Hazard Toxicity Class 2, as compared to Class 3 for other materials which could be employed as the major active solvent. With respect to its evaporative characteristics, NPA's volatility range of 2.7 as compared to n-butyl acetate, allows printed indicia on can components to dry rapidly, within 15 seconds at ambient temperatures, and thereby preclude subsequent smearing due to handling, yet not so rapidly as to present jet printer nozzle plugging or other printer apparatus operating or cleaning difficulties.

Further, it has been found that certain solvents used in jet ink compositions are unfortunately highly solvatable of the polymeric parts such as the tubing often used in jet ink printer apparatus. This causes such parts to excessively and problematically swell or fall. Contrastingly, NPA is less solvatable as to polymers of which such parts are often made and thereby reduces the possibilities of their swelling or failure.

Still further, the ink compositions of this invention have proven significantly more stable than most conventional jet inks which require frequent jet printer adjustments as to operating pressures and crystal drive voltages, due to minor changes in ambient temperature and humidity.

SUMMARY OF THE INVENTION

The objectives of this invention are achieved by binder-type compositions employing NPA as the major solvent. Representative compositions may be illustrated by jet ink solutions comprises of a solvent blend comprising from about 50 to 90% NPA, about 2 to 30% of a high boiling secondary solvent and about 6 to 30% of an auxiliary solvent, a lower aliphatic alcohol; from about 3 to 25% of a binder resin; about 0.5 to 5% of a colorant; 0 to 5% of an electrolyte, and optionally, 0 to 2% of a surfactant.

DETAILED DESCRIPTION OF THE PREFERED EMBODIMENTS

The ink compositions of this invention all include NPA as the major solvent, and resin binders soluble therewith as essential components which, in combination with other components, but mainly due to the presence of NPA, provide improvements in stability, toxicity, flammability, handling and use, while conveying required volatility, wetting ability, drying speed, and the ability to penetrate a variety of lubricants and organic resin coatings.

Also as previously described, the inks of the invention are as applicable to coated as to uncoated steel or aluminum. The binder-containing inks of the invention are applicable to metal coated with a variety of coatings including epoxy resins, epoxy-urea formaldehyde resins, polyester-epoxy resins, acrylic resins, polyvinyl choloride resins, etc. and they have the ability to penetrate oily lubricants present on the surfaces of said coated metal including both internal and external lubricants, lubricants such as mineral wax, silicone, polyolefin, lanolin, natural wax, mineral oil, etc. Inks of this invention containing NPA and certain resin binders soften and swell the polymeric resin coating of the metal substrate sufficiently to allow a colorant component of the ink to penetrate the surface layers of the polymeric coating. Upon removal of the ink solvents by evaporation, the colorant component of the ink remains embedded in the resinous polymeric can coating, primarily within the coating rather than on the surface thereof. The protective coating of the TFS or coated ETP or aluminum can thereby serves not only as the substrate for supporting the printed indicia, but may also act as the binder for the ink. Because of the penetration of the colorant into the internal structure of the coating, the printed indicia becomes an integral part of the coating and is substantially immune to abrasion. In those instances wherein the primary colorant component does not significantly penetrate the coating, the primary colorant plus a resin-compatible secondary colorant component remains resident in the resin binders of this invention, after solvent evaporation, to achieve visible, abrasion-resistant coloration.

The inks of this invention, though applicable to either coated or uncoated steel or aluminum, being binder-type inks, are practically beneficial to such cans devoid of organic coatings. In this instance, the NPA in combination with the resin binder and other components convey the same advantages of volatility, speed of process, wettability of the substrate and penetration of oily lubricants as discussed relative to the coated steel or aluminum, but in this instance, the binder in the composition and in which the colorant resides adheres to the metal substrates and the colorant is embedded in the binder and there by rendered abrasion resistant.

As indicated, to be effective in the compositions of the present invention, the ink solvent blend must be capable of penetrating any waxy or oily lubricating film residues which remain on the surface of the coated TFS can as a result of the processing steps utilized in stamping and shaping the can components from sheet or roll stock, and, where the can components are coated, the compositions must effect temporary softening and swelling of the polymer resin can coating sufficient of allow penetration of the colorant into the swollen body of the coating.

In the selection of the ink solvents of the solvent blend therefore, consideration must be given to achieving the desired effects on the can components and/or coatings as well as obtaining the proper solubility for binder, the colorant and other components of the ink and also to achieving the desired viscosity and evaporative characteristics, as well be discussed hereinafter. Consideration must also be given to the propensity of the solvents to wet the substrate as measured by the property of surface tension of the solvent and of the ink composition incorporating it. Water, for example, will not properly wet the surface of a TFS can because of its undesirably high surface tension (72 dyne cm. at standard temperature) and inks having a water base are not satisfactory for use in TFS can printing, although such inks have been employed in jet printing of paperboard, for example, since paperboard surfaces are readily wet by water. On the other hand, some oxygenated solvents such ketones, alcohols, ethers and esters, which have surface tensions much lower than water, wet bare metal cans so readily that the uncoated metal surface is flooded by the solvent, which spreads out and merges with other droplets to obscure the limits of any indicia printed by use of these solvents. The inks of the present invention, as used on a TFS can surface, are compounded to have surface tensions at 68° F., of between about 26 and about 30 dyne cm.

Selection of the solvent system, must also involve consideration to safety, handling, and other operative and compatibility factors, such as toxicity, flash point and solvating ability with respect to the particular polymeric materials used in the jet ink printer apparatus to be employed.

Generally speaking, the ink compositions of this invention are comprised of a solvent blend mainly for solvating the resin binder and for wetting and penetrating organic coatings, waxes and lubricants; a colorant or colorants for imparting color to the ink; a resin binder to provide ink viscosity and bind the colorant onto bare metal or uncoated surfaces or surfaces with respect to which colorant penetration into the surface coating is not achieved; an electrolyte to provide conductivity requisite for the jet ink printing process; and, optionally, a surfactant for controlling wetting of certain TFS surfaces.

The Solvent Blend

Although minor amounts of other suitable solvents may be included if desired, the solvent blend of this invention is comprised of (a) from about 50 to 90% of a major, active solvent, n-propyl acetate (NPA) (b) as a secondary solvent, about 2 to 30% of a high boiling solvent, and (c) about 6 to about 30% of an auxiliary solvent. All percentages enumerated in this document are based on the total weight of the ink composition.

The preferred major, active solvent is NPA.

In line with previous discussions regarding requisite characteristics and functions of solvent in jet ink compositions, NPA has the following key properties with respect to the ink compositions of this invention: (a) the ability to spread over a wide variety of low surface energy surfaces, (b) the ability to penetrate typical polymeric coatings and lubricants found primarily on metal container surfaces, (c) a volatility relative to n-butyl acetate of between 1 and 5 to assure required drying times, stability with respect to solvent loss, and compatibility with polymers of plastic printer parts to prevent their swelling or failure during printer operations (d) a flash point which permits safe ink manufacture, handling, usage and storage, at existing ambient temperatures, and (e) toxicity levels such that the typical safety measures will adequately prevent hazardous exposure to workers.

A comparison of key properties of several active solvents is shown in Table I.

As indicated by the data shown in Table I, of all of the solvents listed, only NPA had acceptable levels of all key properties.

TABLE I
COMPARISON OF ACTIVE SOLVENTS

| Solvent | Spreading Contact Angle (°) (Grammar Wax) | Penetration TFSA* | Penetration TFSB* | Solubility Parameter | Volatility** | Safety and Toxicity Flash Point, °F. | TLV, ppm. | Sax Hazard Rating |
|---|---|---|---|---|---|---|---|---|
| N-Propyl Acetate | ≦7 | 5 | 5 | 8.8 | 2.7 | 60 | 200 | 2 |
| I-Propyl Acetate | ≦7 | 4 | 2 | 8.6 | 4.6 | 35 | 250 | 2 |
| Tetrahydrofuran | ≦7 | 5 | 5 | 9.5 | 7.8 | −14 | 200 | 3 |
| Furfural | 16 | 4 | 4 | 11.9 | — | 60 | 5 | — |
| Dioxane | 8 | 1 | 0 | 10.1 | 2.7 | 54 (OC) | 50 | — |
| Dimethyl Formamide | 28 | 3 | 1 | 11.8 | 0.28 | 136 | 10 Skin | 2 |
| 4-Methyl-2-Pentanone | ≦7 | 3 | 4 | 8.3 | 1.6 | 73 | 100 | 3 |
| 1,1,1-Trichloroethane | ≦7 | 4 | 5 | 9.9 | — | Nonflammable | 350 | 2 |
| 2-Methoxyl Methyl Acetate | 10.5 | — | 3 | — | 1.3 | 78 | ~500 | — |
| Methyl Cellosolve | 15 | — | — | 10.7 | 0.62 | 103 | 25 Skin | 2 |

Contact Angle means the angle an ink drop makes at the point of contact with a substrate. The angle indicates the degree of wetting of the substrate. Acceptable values are 7° or less.
*1 to 10 scale; the higher the value the greater the penetration.
—Test not run. For Relative Volatility, it means data not available.
TFSA is an epoxy/urea formaldehyde varnish with a lanolin internal lubricant and a polyolefin external lubricant.
TFSB is a modified acrylic varnish with a silicone external lubricant.
TLV means threshold limit value; the lower value the less acceptable it is; "Skin" means skin absorption.
OC = Open cup; otherwise, closed cup.
**Volatility - relative to n-butyl acetate.
The Sax Hazard Ratings are taken from "Dangerous Properties of Industrial Materials" 4th Edition, by N. Irving Sax, Van Nostrand Riechhold Co. N.Y. The table shows values from the most serious category of toxic Hazard Analysis (Acute Systemic for Ingestion and Inhalation). The values range from 1 to 3. A rating of 3 means HIGH. A rating of 2 means MODERATE.

The high boiling solvents which can be employed as the secondary solvent in the solvent blend of this invention include methyl cellosolve, dimethyl formamide and 2,4-pentanedione. The preferred one is methyl cellosolve. These solvents boil at higher temperatures than the major active solvent NPA and are employed in the range of about 2 to 30% by weight to keep any ink remaining in printer nozzles from drying when the printer is shut off. Ideally, the secondary solvent should have similar penetrating, wetting and safety qualities as the major, active solvent and it should be a very good solvent for the binder.

The solvent blend also includes from about 6 to 30% of an auxiliary solvent selected from the group consisting of a lower aliphatic alcohol of from 1 to 3 carbon atoms, and mixture thereof. The preferred auxiliary solvent is methanol, from about 8 to 16% by weight. The auxiliary solvent is needed in most formulations of this invention for printing applications to solubilize the electrolyte and achieve an operable resistivity of no higher than above 2,200 ohm-cm. Since the auxiliary solvent tends to inhibit spreading and penetration, judicious amounts should be employed.

The Colorant

A colorant, including combinations of colorants, at levels of about 0.5% to 5% is required to impart color to the ink. The colorant which can be employed in the inks of this invention is comprised at least a primary, mobile dyes. For some printing applications, the colorant includes a secondary, less mobile, relatively stationary dye. The primary mobile dye is carried by the active solvent during swelling of, or penetration into polymer coatings on metal surfaces to provide abrasion resistant colored printing even if the resin is scuffed away from the metal surface. In situations wherein the active solvent does not swell and penetrate the polymer coating sufficiently, or on bare metal surfaces, the employment of a secondary, less mobile or relatively stationary dye (relative to the primary dye) is advisable since it will remain resident in the binder of ink jet printed indicia despite subjection to to severe and extractive conditions encountered by printed filled containers during processing.

The characteristics which render a colorant or dye satisfactory as a primary, mobile, penetrating dye, or as a secondary, relatively stationary dye are related to solubility with respect to the solvent blend and binder, a molecular size capable of penetrating the swelled coatings, molecular functionality and dye intensity. Whereas most acid dyes are not appreciably soluble in NPA and therefore would be inoperable, most basic dyes, oil soluble and spirit soluble dyes are sufficiently soluble.

Although the preferred mobile dye for the invention is BASF Oil Soluble Red P available commercially from BASF Wyandote Corp., other suitable mobile dyes include those sold under the trademark Lurafix, such as Lurafix Violet 6B, and Oil Soluble Red 7B, Crystal Violet FN, Rhodamine FB, and Neozapon Red GE, all commercially available from BASF Wyandote Corp. The preferred secondary, stationary dye is Neozapon Fiery Red BL, also commercially available from BASF Wyandote Corp. Other secondary dyes which can be employed include Cresol Red, commercially available from Matheson, Coleman and Bell Manufacturing Chemists, Inc. and Neozapon Red GE, and Neozapon Green 3G, each commercially available from BASF, etc.

THE RESIN BINDER

The inks of this invention though suitable for use on both coated and uncoated TFS, ETP and aluminum substrates, are particularly effective for uncoated cans, since the binder has the requisite properties of solubility in the solvent medium and the ability to anchor the colorant component on the uncoated metal surface. At the same time, the solvent component properly wets the metal surface, penetrates waxy or oily lubricant present on the surface which may impede adhesion of the ink and, as previously emphasized, also conveys additionally improved volatility and safety factors. Of course, the binder ink compositions may also be utilized with coated metal cans where the solvent will either penetrate the coating and carry the colorant and binder into subsurfaces of the coating, or hold the colorant on the polymer coating surface when the solvent does not penetrate the polymer coating. Since many canners frequently change from coated to uncoated containers, provision of these types of compositions provide the ability to produce printed indicia by either of two mechanisms, i.e. by penetration or adhesion.

Resins having the requisite molecular weight, solubility and compatibility with the other ink components, particularly of the solvent blend and adherence to the substrate are employable herein.

The resins suitable for use herein are classified as including low molecular weight (below about 2,500), B and C-stage, modified phenolic polymers, for example, epoxy-phenolic resins and epoxy ethers of bisphenols. Such resins are well known in the art and are generally derived from the alkaline catalyzed reaction of epichlorohydrin with said bisphenols. Such classic epoxy resins are believed to have the form of polyglycidyl or diglycidyl ether of bisphenol A. Especially preferred are epoxy-phenolic resins having a molecular weight in the range of from about 500 to 2500. The prime requirement of the resin is that it must exhibit suitable solubility and compatibility, particularly with the components of the solvent blend, for incorporation in the ink compositions of this invention and be of sufficiently low viscosity so that the viscosity of the ink is increased to from about 1 to 4.0 centipoises (cp). Among the preferred resins are epoxy-phenol resins available commercially under the trademark Varcum, particularly Varcum 8357, from Reichhold Chemicals, Inc.

Other preferred resins are of the high gloss, quick solvent-release, highly aliphatic-tolerant, phenol-modified rosin ester type, such as commercially available under the trademark Beckacite, for example, Beckacite 24-117, from Reichhold Chemicals, Inc, non-heat reactive, oil-soluble phenolic binders available commercially under the trademark Bakelite, for example, Bakelite CKM 0036 and Bakelite CKM 2400, and heat reactive phenolic binders such as Bakelite BKR/2620, each commercially available from Union Carbide Corporation.

Although it has been found that suitable resins are of low molecular weight, are B and C-stage, modified phenolic polymers, and are soluble in NPA, not all so described resins will work. For example, heat reactive Bakelite BLS 2700 is not soluble with respect to components in the ink composition, and the thermoplastic phenolic sold under the trade designation Durez 22600, by Hooker Chemicals and Plastics Corporation, are unsuitable because they are not sufficiently filterable through a one micron pore-sized membrane filter.

The resin component is employed in accordance with this invention at a level of from about 3 to 25% by weight of the total composition. Again, resin is critical herein since it is believed to convey the properties permitting the ink compositions to exhibit the excellent printing and adhesion properties, on a variety of substrates displayed by the inks of the invention. As previously mentioned, and more particularly, the aforedescribed resins hold non-penetrating colorants and render them visible on bare metal surfaces as well as on polymer coatings not swollen by the major, active solvent.

The Electrolyte

Since the ink compositions of this invention must have an operable specific resistivity that is, a resistivity of say 1 to no higher than about 2,200 ohm-cm, it is often necessary to employ a material that functions as an electrolyte therein. Above 2,200 ohm-cm, it becomes increasingly difficult to charge ink droplets before they break off. The electrolytic component must be soluble in the ink medium and have no deleterious effect on the printing apparatus or on the printed substrate. Satisfactory electrolytic compounds for use as electrolytes include most alkyl ammonium halides, for example, alkyl ammonium chlorides, and quarternary ammonium halides, for example tetramethylamonium chloride, or mixtures thereof. Although, it is preferred to use an electrolytic component which functions mainly as an electrolyte, although the electrolytic component per se may be avoided if another component of the ink composition, preferably the colorant, functions as the electrolyte. Neozapon Fiery Red BL is such a colorant. The preferred electrolyte is dimethyl amine hydrochloride. Materials which have been found unsuitable as electrolytes in ink compositions of this invention include sodium propionate, sodium acetate and ammonium chloride.

The amount of electrolyte employed depends upon the amount and type of colorant used and the amount of polar solvents used in the solvent system. Generally, an effective amount of electrolyte is in the range of about 0.0 to 5 percent of the total ink composition.

The Surfactant

A surfactant is not required but may be employed as needed to increase the wetting of some surfaces to be printed upon, or to reduce excessive spreading on other easily wet surfaces. Although, in general, ink performance is better without a surfactant, suitable individual surfactants or mixtures thereof in amounts in the range of from 0.0 to about 5% of the ink compositions may be judiciously employed, the upper level thereof being determined by loss of adhesion between the resin binder and the substrate.

The preferred surfactants for the ink compositions of this invention are non-ionic fluorosurfactants, for example, fluorinated alkyl esters such as those sold under the trade designations FC-430, FC-431 and FC-170, by the Minnesota, Mining and Manufacturing Company. Other suitable surfactants include FC-95 and FC-98 (each anionic potassium perfluoro alkyl sufonates), FC-128 (anionic potassium fluorinated alkyl carboxylates), FC-134 (cationic fluorinated alkyl quaternary ammonium iodides), all commercially available from the Minnesota, Mining and Manufacturing Company, and non-ionic fluorosurfactants such as designated FSN and sold under the trademark Zonyl by E. I. DuPont de Nemours and Company.

The ink compositions of the invention do not require water and its use as a component is not recommended since its presence decreases the penetrating activity of the NPA solvent and tends to separate the ink into phases by precipitating the resin from the ink solution.

Representative formulations illustrating and exemplifying the ink compositions of this invention and meeting the objectives and end use requirements discussed hereinabove and which are effective in jet ink operations, are shown in the Table below.

TABLE II

INK COMPOSITIONS

| Ink Components | A | A1 | A2 | A3 | B |
|---|---|---|---|---|---|
| Major Solvent, % | N-Propyl Acetate 62.1 | N-Propyl Acetate 64.5 | N-Propyl Acetate 67.6 | N-Propyl Acetate 67.6 | N-Propyl Acetate 61.0 |
| High Boiling Solvent, % | Methyl Cellosolve 4.8 | Methyl Cellosolve 5.0 | Methyl Cellosolve 3.7 | Methyl Cellosolve 3.7 | Methyl Cellosolve 3.8 |
| Alcohol, % | Methanol 14.4 | Methanol 15.0 | Methanol 9.0 | Methanol 9.0 | Methanol 20.2 |
| Dye 1, % | Oil Soluble Red P 0.96 | Oil Soluble Red P 0.75 | Oil Soluble Red P .76 | Oil Soluble Red P .76 | Oil Soluble Red P 0.94 |
| Dye 2, % | Neozapon Fiery Red BL 0.72 | Neozapon Fiery Red BL 0.75 | Neozapon Fiery Red BL .76 | Neozapon Fiery Red BL .76 | — |
| Binder, % | Varcum 8357 16.0 | Varcum 8357 12.0 | Beckacite* 24-117 15.2 | Bakelite CKM 0036** 15.2 | Varcum 8357 11.7 |
| Electrolyte, % | Dimethyl-amine Hydrochloride 1.9 | Dimethyl-amine Hydrochloride 2.0 | Dimethyl-amine Hydrochloride 3.0 | Dimethyl-amine Hydrochloride 3.0 | Dimethyl-amine Hydrochloride 2.4 |
| Surfactant, % | None Used | None Used | None Used | None Used | FC-430, 0.074 |
| Resistivity ohm-cm. | 1,840 | 2,100 | 2,000 | 2,000 | 1,020 |

| Ink Components | C | D | E | F |
|---|---|---|---|---|
| Major Solvent, % | N-Propyl Acetate 59.0 | N-Propyl Acetate 55.0 | N-Propyl Acetate 61.9 | N-Propyl Acetate 54.4 |
| High Boiling Solvent, % | Methyl Cellosolve 5.0 | Methyl Cellosolve 10.0 | Dimethyl Formamide 4.5 | 2,4-Pentanedione, 10.0 |
| Alcohol, % | Methanol 20.0 | Methanol 20.0 | Methanol 18.6 | Methanol 20.0 |
| Dye 1, % | Oil Soluble Red P 1.0 | Oil Soluble Red P 1.0 | Oil Soluble Red P 0.95 | Oil Soluble Red P 1.0 |
| Dye 2, % | — | — | — | — |
| Binder, % | Varcum 8357 12.0 | Varcum 8357 12.0 | Varcum 8357 11.8 | Varcum 8357 12.0 |
| Electrolyte, % | Dimethyl-amine Hydrochloride 2.5 | Dimethyl-amine Hydrochloride 1.5 | Dimethyl-amine Hydrochloride 2.2 | Dimethyl-amine Hydrochloride 2.5 |
| Surfactant, % | FC-430, 0.50 | FC-430, 0.50 | FC-430, 0.095 | FC-430, 0.1 |
| Resistivity ohm-cm. | — | — | 1,250 | 860 |

*Registered Trademark of, and commercially available from Reichhold Chemicals, Inc.
**Registered Trademark of, and commercially available from Union Carbide Corporation.

The formulations shown in Table II were employed in a jet printing apparatus to print indicia on the ends of various coated and uncoated end panels as indicated by the Example and data shown in Table III. The printed indicia obtained from Compositions A through F were very clean and legible, and dried very quickly to form images having excellent resistance to abrasion and excellent resistance to water. During 1015 hours of operation of a jet printer unit with the ink composition designated as A-1 above, nine integrity faults and one high voltage fault occured with a-11 type A. B. Dick Company printer nozzle. During the last 580 of that run a-16 type A. B. Dick Company nozzle was used, and only three integrity faults occured. These may have been caused by very hot humid weather evident when the faults occurred. Since, conventionally, no faults during an eight hour run is considered good, the above test results show the A-1 ink composition is greatly superior to conventional jet inks. Evaporative losses from the ink supply system can conventionally be compensated for by the addition, as needed, of make-up solution containing a suitable amount of volatile solvents.

EXAMPLE 1

To further illustrate the advantages of the ink compositions of this invention, additional jet ink compositions devoid of NPA as a major active solvent and outside the scope of the present invention are prepared for comparative purposes:

| Formulation G | |
|---|---|
| Sodium lauryl sulfate | 13.0% |
| 2-Heptanone | 57.0% |
| Water | 13.9% |
| Methanol | 11.9% |
| 1-Decene | 3.0% |
| Victoria Pure Blue FGA | 1.2% |
| Formulation H | |
| Methyl ethyl ketone | 28.5% |

-continued

| | |
|---|---|
| Methyl Cellosolve | 9.7% |
| Methanol | 28.1% |
| Isopropanol | 6.4% |
| Water | 10.3% |
| Varcum 8357 | 14.5% |
| Spirit Soluble Fast Violet RR Manufactured by BASF | 2.0% |
| Dimethylamine Hydrochloride | 0.26% |
| FC-430 Surfactant | 0.09% |
| Formulation I | |
| Shellac | 4.4% |
| Solox (denatured ethyl alcohol) | 10.2% |
| Methanol | 52.7% |
| Dimethylamine hydrochloride | 1.4% |
| Ammonium hydroxide (26° Baume) | 0.8% |
| Victoria Pure Blue FGA | 0.9% |
| Water | 20.0% |
| Methyl cellosolve | 9.6% |
| Formulation J | |
| Proprietary ink "M&T 470" - (M&T Chemicals). | | in the random selection and testing. These ends are designated as Example Nos. 10 through 15.

The adhesion and penetrability of indicia applied was evaluated by applying the indicia, and rubbing with thumb pressure after a 15 second interval. The indicia which had not dried sufficiently resulted in smudging by thumb scuffing and were deemed to have inadequate penetrability and rub-resistance. Such results are indicated in Table III by the designation F for failed; in those instances where legibility was reduced but indicia were readable, the results are indicated by M for marginal; and in those instances where indicia retained boldness of legibility, the results are indicated by P for pass.

Wettability and visibility of the indicia is evaluated by measuring the dot diameters, in millimeters. Such diameter measurement indicates how well the ink spreads on the metal substrate, the higher the value, the more visible the indicia.

The "% in solids" in the Table represents the % of

TABLE III

| No. | Varnish Resin Type | Lubricant Type | % in Solids | Ink Compositions | | | | | | | | | Ink Formulations | | | |
|---|---|---|---|---|---|---|---|---|---|---|---|---|---|---|---|---|
| | | | | A | A-1 | A-2 | A-3 | B | C | D | E | F | G | H | I | J |
| 1 | EUF | None | 0 | 0.41P | 0.36P | 0.53P | 0.57P | 0.36M | — | — | 0.45M | — | 0.42P | 0.27P | 0.35P | 0.42P |
| 2 | EUF | Lanolin | 1.5 | 0.38P | 0.52P | 0.46P | 0.51P | 0.36P | — | — | 0.53P | — | 0.41P | 0.28P | 0.37P | 0.47P |
| 3 | EUF | Lanolin | 1.5 | 0.45P | 0.37P | 0.47P | 0.35P | 0.24P | 0.25F | 0.38P | 0.31P | 0.36P | 0.41P | 0.21M | 0.40P | 0.35M |
| 4 | EUF | Lanolin | 1.5 | 0.22P | 0.36P | 0.41P | 0.40P | 0.23P | 0.27M | 0.32F | 0.49F | 0.36P | 0.38P | 0.22M | 0.28M | 0.30P |
| 5 | EUF | Polyolefin | 0.75 | 0.35P | 0.33P | 0.46P | 0.48P | 0.24P | 0.30P | 0.31P | 0.45P | 0.28M | 0.37F | 0.28P | 0.35M | 0.50P |
| 6 | EUF | Wax | 0.66 | 0.55P | 0.46F | 0.45P | 0.55F | 0.24M | 0.29P | 0.27F | 0.32P | 0.22F | 0.26F | 0.20F | 0.18F | 0.30P |
| 7 | Modified Epoxy | Mamic Wax | 0.18 | 0.38P | 0.47P | 0.47P | 0.49P | 0.44P | 0.39P | 0.37P | 0.52P | 0.32P | 0.38P | 0.35M | 0.31P | 0.40P |
| 8 | Polyester Amine | Silicone | 0.30 | 0.42P | 0.48P | 0.44P | 0.42P | 0.46P | 0.43P | 0.46P | 0.50P | 0.44P | 0.33P | 0.37P | 0.31P | 0.42P |
| 9 | Modified Acrylic | Silicone | Unknown | 0.47P | 0.38P | 0.48P | 0.58P | 0.31M | 0.33P | 0.32P | 0.61P | 0.38- | 0.46M | — | 0.40F | 0.45P |
| 10 | Unknown | (Composition Unknown) | | 0.21P | 0.25P | 0.48P | 0.41P | 0.26M | 0.27M | 0.26P | 0.37F | 0.25M | 0.47M | 0.20M | 0.37F | 0.40P |
| 11 | Unknown | (Composition Unknown) | | 0.26P | 0.35P | 0.48P | 0.47P | 0.42M | 0.45P | 0.39P | 0.40M | 0.30M | 0.45F | 0.23P | 0.35P | 0.37P |
| 12 | Unknown | (Composition Unknown) | | 0.59P | 0.64P | 0.56P | 0.71P | 0.50P | 0.48P | 0.48P | 0.53P | 0.48P | 0.40P | 0.31P | 0.37P | 0.49M |
| 13 | Unknown | (Composition Unknown) | | 0.20P | 0.19F | 0.47P | 0.42P | 0.35M | 0.27P | 0.29M | 0.39F | 0.26F | 0.41F | 0.20F | 0.35F | 0.40P |
| 14 | Unknown | (Composition Unknown) | | 0.43P | 0.54P | 0.65P | 0.50P | 0.51P | 0.48P | 0.48P | 0.52P | 0.47P | 0.45P | 0.32P | 0.40F | 0.49P |
| 15 | Unknown | (Composition Unknown) | | 0.30P | 0.21F | 0.45P | 0.38P | 0.29P | 0.24P | 0.28M | 0.41F | 0.27F | 0.37P | 0.23P | 0.35F | 0.40P |
| 16 | Bare Tin Plate | None | None | 0.45P | 0.51F | 0.48P | 0.53P | 0.31P | 0.46P | 0.42P | 0.29F | — | —* | 0.35P | 0.40P | — |
| 17 | Bare Aluminum | None | None | 0.55P | 0.74P | 0.56P | 0.70P | — | — | — | — | — | —* | — | — | — |
| | | Total Passed | | 16P | 12P | 17P | 16P | 10P | 11P | 10P | 8P | 6P | 9P | 5P | 4P | 13P |
| | | Total Marginal | | 0M | 0M | 0M | 0M | 6M | 2M | 2M | 2M | 3M | 2M | 4M | 3M | 2M |
| | | Total Failed | | 0F | 4F | 0F | 1F | 0F | 1F | 2F | 6F | 3F | 4F | 3F | 9F | 0F |
| | Average Dot Diameters, mm. | | | 0.40 | .040 | 0.49 | 0.49 | 0.35 | 0.35 | 0.36 | 0.44 | 0.34 | 0.40 | 0.27 | 0.35 | 0.41 |

P = Pass
M = Marginal
F = Fail
EUF = Epoxy-urea formaldehyde
— = not tested
—* = not tested (F inevitable due to absence of resin binder)
Nos. 10-15, lubricants varied in type and amount.

Formulations A through F, shown in Table II, and formulations G through J above were employed in a jet ink printing apparatus to apply identifying indicia on bare tin plate and bare aluminum as well as on various types of TFS varnishes having various types of internal and external lubricants either incorporated therein or applied thereto. Results are shown in Table III.

The substrates were in the form of TFS lids for metal containers and were selected and tested without regard to bake conditions imposed on the varnish to best simulate conditions in a canning plant to test the effect of the inks on such varnishes and ends randomly selected. Additionally, ends having varnishes applied thereto obtained from canners in which the varish resin type and lubricants employed were unknown were included lubricant added prior to applying the varnish to allow the metal plate to be handled during forming of the can components and is expressed as the percentage of lubricant comprising the total solids of the varnish.

As seen from the data set forth in the above Table, ink compositions of the invention, particularly compositions A through A3 possess the ability to penetrate and adhere to a broad spectrum of varnishes having a variety of lubricants on the surfaces thereof.

Wettability and image formation for each of the compositions A through F of the invention were at least equal or superior to all of the compared inks considering all factors including spreadability, penetration, solubility, relative volatility, dot diameter, abrasion, resistance, stability safety and toxicity.

Compositions A, A2, and A3 were unquestionably the best overall inks tested. Composition E conveyed improved penetrability through high levels of silicone lubricant, while Composition C conveyed improved penetrability through wax coated and other highly lubricated substrates. Almost all of the Compositions of the invention performed well with respect to the uncoated substrates.

While it may appear that Formulation J shows drop diameter and wipe test results comparable to certain of the ink formulations of this invention, the latter are preferred since, as indicated by the previously discussed test run of 1015 hours, the inks are more tolerant to ambient conditions occuring in printer environments, and they markedly reduce ink-related printer faults and the need for printer readjustments.

I claim:

1. An ink composition suitable for use in jet ink printing operations comprising a solution of:
   (a) a solvent blend comprised of;
      (i) from about 50 to 90% n-propyl acetate as a major solvent;
      (ii) a secondary solvent of from about 2 to 30% of a high boiling solvent selected from the group consisting of methyl cellosolve, dimethyl formamide, and 2,4-pentanedione; and
      (iii) about 6 to 30% of an auxiliary solvent selected from the group consisting of lower aliphatic alcohols having from 1 to 3 carbon atoms, and mixtures thereof;
   (b) about 0.5 to 5.0% of a colorant comprised of at least a primary dye, soluble and compatible with the ink composition components;
   (c) about 3 to 25% of a binder soluble and compatible with the solvent blend, and
   (d) an effective amount of an electrolyte, all of said percentages being based on the total weight of the ink composition.

2. The ink composition of claim 1 wherein the high boiling solvent is methyl cellosolve, the lower aliphatic alcohol is methanol, the binder has a molecular weight below about 2500 and is selected from the group consisting of B-and C-stage modified phenolic polymers, and the electrolyte is an alkyl ammonium halide.

3. The ink composition of claims 1 or 2 wherein the electrolyte is an alkyl ammonium chloride.

4. The ink composition of claim 3 wherein the composition includes an effective amount of surfactant.

5. The ink composition of claim 4 wherein the surfactant is a fluorinated alkyl ester.

6. The ink composition of claim 4 wherein the colorant includes a secondary dye.

7. The ink composition of claim 6 wherein the primary dye is Oil Soluble Red P and the secondary dye is Neozapon Fiery Red BL.

8. The ink composition of claim 7 wherein the surfactant is a fluorinated alkyl ester.

9. The ink composition of claim 1 or 2, wherein the colorant includes a secondary dye.

10. The ink composition of claim 9 wherein primary dye is Oil Soluble Red P and the secondary dye is Neozapon Fiery Red BL.

11. The ink composition of claim 1 or 2 wherein the composition includes an effective amount of surfactant.

12. The ink composition of claim 11 wherein the surfactant is a fluorinated alkyl ester.

13. A jet ink composition capable of bonding to uncoated steel and aluminum substrates or such substrates having tin and/or polymeric resin coatings or lubricants or combinations thereof on its surfaces, said compositions penetrating the lubricants or resins to effect adhesion to said substrate, and comprising a solution of:
   (a) a solvent blend comprised of (i) from about 50 to 90% n-propyl acetate as a major solvent, (ii) a secondary solvent of from about 2 to 30% of a high boiling solvent selected from the group consisting of methyl cellosolve, dimethyl formamide and 2,4-pentanedione, and (iii) about 8 to 30% of an auxiliary solvent selected from the group consisting of lower aliphatic alcohols having from 1 to 3 carbon atoms, and mixtures thereof,
   (b) about 0.5 to 5% of a colorant comprised of a primary dye, soluble and compatible with the ink composition components;
   (c) about 3 to 25% of a binder, soluble and compatible with the solvent blend, and
   (d) an effective amount of an alkyl ammonium halide as an electrolyte, all of said percentages being based on the total weight of the ink composition.

14. The jet ink composition of claim 13 wherein the lower aliphatic alcohol is methanol, the binder has a low molecular weight and is selected from the group consisting of B and C-stage modified phenolic polymers, and the electrolyte is dimethyl amine hydrochloride.

15. The jet ink composition of claim 14 wherein there is included a surfactant in the amount of from about 0 to 2% based on the total weight of the ink composition.

16. The jet ink composition of claim 13, 14, or 15 wherein the composition includes a secondary dye.

17. The jet ink composition of claim 16 wherein the primary dye is Oil Soluble Red P and the secondary dye is Neozapon Fiery Red BL.

18. The jet ink composition of claim 13 wherein the solvent blend is comprised of (i) from about 50 to 70% n-propyl acetate, (ii) from about 3 to 12% methyl cellosolve, (iii) and from about 8 to 25% methanol, the primary dye is from about 0.5 to 1.5 Oil Soluble Red P, the binder is selected from the group consisting of epoxy-phenolic resins, epoxy ethers of bisphenol A, phenol-modified rosin esters, oil soluble non-heat reactive phenolic resins and heat reactive phenolic resins in an amount of from about 10 to 18%, and the electrolyte is from about 1 to 3% dimethyl amine hydrochloride.

19. The jet ink composition of claim 18 wherein the composition includes a fluorinated alkyl ester surfactant, present in the amount of about 0 to 2% based on the total weight of the ink composition.

20. The jet ink composition of claim 18 or 19 wherein the ink composition includes from about 0.5 to 1.5% of a secondary dye that is less mobile relative to the primary dye.

21. The jet ink composition of claim 20 wherein the secondary dye is Neozapon Fiery Red BL.

22. A jet ink composition capable of bonding to uncoated steel and aluminum substrates or such substrates having tin and/or polymeric resin coatings or lubricants or combinations thereof on its surfaces, said compositions penetrating the lubricants or resins to effect adhesion to said substrate, and comprising a solution of:
   (a) a solvent blend comprised of (i) about 60 to 70% n-propyl acetate as a major solvent (ii) about 3 to 9% methyl cellosolve as a high boiling secondary solvent, and (iii) about 12 to 16 methanol as an auxiliary solvent;

(b) a colorant comprised of from about 0.5 to 1.5% Oil Soluble Red P as a primary mobile dye, and about 0.5 to 1.5% Neozapon Fiery Red BL as a secondary dye;

(c) about 13 to 19% of a selected from the group consisting of epoxy-phenolic resins, epoxy ethers of bisphenol A, phenol-modified rosin esters, oil soluble non-heat reactive phenolic resins and heat reactive phenolic resins in an amount of;

(d) about 1 to 3% of dimethylamine hydrochloride as an electrolyte, said jet ink composition having a resistivity of about 1800 to 1900 ohm-cm, all of said percentages being based on the total weight of the jet ink composition.

23. The jet ink composition of claim 22 wherein the binder is a quick solvent-release, highly aliphatic-tolerant phenol-modified rosin ester resin.

24. The jet ink composition of claim 22 wherein the binder is a non-heat reactive oil soluble phenolic resin.

25. A jet ink composition capable of bonding to steel or aluminum substrates having tin and/or polymeric resin coatings or lubricants or a combination of tin and/or polymeric resin coatings and lubricants on the surfaces thereof, said composition penetrating the lubricant and polymeric resins to effect adhesion to said metal substrates and comprising a solution of:

(i) about 58 to 60% n-propyl acetate as a major solvent, (ii) about 3 to 6% methyl cellosolve as a high boiling secondary solvent, and (iii) about 18 to 22% methanol as an auxiliary solvent;

(b) a colorant comprised of about 0.5 to 1.5% Oil Soluble Red P as a primary mobile dye; and about 0 to 2% Neozapon Fiery Red BL as a secondary dye;

(c) about 10 to 14% of an epoxy ether of bisphenol A as a binder; and (d) about 2 to 3% of dimethylamine hydrochloride as an electrolyte;

(e) about 0 to 1.0% of a fluorinated alkyl ester surfactant said jet ink composition having a resistivity of about 1800 to 2200 ohm-cm, all of said percentages being based on the total weight of the jet ink composition.

26. A jet ink composition capable of bonding to steel or aluminum substrates having tin and/or polymeric resin coatings or lubricants or a combination of tin and/or polymeric resin coatings and lubricants on the surfaces thereof, said composition penetrating the lubricant and polymeric resins to effect adhesion to said metal substrates and comprising a solution of:

(i) about 60 to 64% n-propyl acetate as a major solvent, (ii) about 3 to 6% dimethyl formamide as a high boiling secondary solvent, and (iii) about 16 to 20% methanol as an auxiliary solvent;

(b) a colorant comprised about 0.5 to 1.5% Oil Soluble Red P as a primary mobile dye; and about 0.5 to 1% Neozapan Fiery Red BL as a secondary dye;

(c) about 10 to 14% of an epoxy ether of bisphenol A as a binder; and (d) about 2 to 3% of dimethylamine hydrochloride as an electrolyte;

(e) about 0.5 to 1.5% of a fluorinated alkyl ester surfactant, said jet ink composition having a resistivity of about 1200 to 2200 ohm-cm, all of said percentages being based on the total weight of the ink jet composition.

* * * * *